(12) United States Patent
Kusunoki

(10) Patent No.: US 9,331,846 B2
(45) Date of Patent: May 3, 2016

(54) COMMUNICATION METHOD AND RECEPTION APPARATUS

(71) Applicant: Sony Mobile Communications, Inc., Tokyo (JP)

(72) Inventor: Shigeo Kusunoki, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 116 days.

(21) Appl. No.: 14/080,865

(22) Filed: Nov. 15, 2013

(65) Prior Publication Data

US 2014/0140449 A1 May 22, 2014

Related U.S. Application Data

(60) Provisional application No. 61/727,382, filed on Nov. 16, 2012.

(51) Int. Cl.
*H04L 7/04* (2006.01)
*H04B 1/7093* (2011.01)
*H04L 27/26* (2006.01)

(52) U.S. Cl.
CPC ............ *H04L 7/042* (2013.01); *H04L 27/2665* (2013.01); *H04B 1/7093* (2013.01); *H04L 27/2662* (2013.01)

(58) Field of Classification Search
CPC ............ H04L 27/2665; H04L 27/2662; H04B 1/7093
See application file for complete search history.

(56) References Cited

U.S. PATENT DOCUMENTS

| 6,515,960 B1* | 2/2003 | Usui et al. ..................... 370/203 |
| 2003/0174767 A1* | 9/2003 | Fujii et al. ..................... 375/229 |
| 2005/0220175 A1* | 10/2005 | Zhou .............................. 375/141 |
| 2007/0113159 A1* | 5/2007 | Lakkis ........................... 714/783 |
| 2010/0067599 A1* | 3/2010 | Dayal et al. .................... 375/267 |

FOREIGN PATENT DOCUMENTS

| JP | 2003-338779 | 11/2003 |
| JP | 2006-295629 | 10/2006 |
| JP | 2010-130246 | 6/2010 |
| JP | 2012503429 A | 2/2012 |

* cited by examiner

*Primary Examiner* — Ross Varndell
(74) *Attorney, Agent, or Firm* — Oblon, McClelland, Maier & Neustadt, L.L.P.

(57) ABSTRACT

An electronic device that digitizes a baseband signal obtained from a received high-frequency signal; specifies a position of a preamble included in the digitalized signal; calculates a square of the preamble; specifies a peak from a value obtained by the square of the preamble; performs a fast Fourier transform (FFT) on the baseband signal using a position of the peak as a start of an FFT window; extracts phases of a plurality of frequency components for phase measurement from the baseband signal which has been subjected to the FFT; obtains a phase difference of the plurality of phases; and obtains a phase correction value of a reception signal using the phase difference and a phase reference.

19 Claims, 12 Drawing Sheets

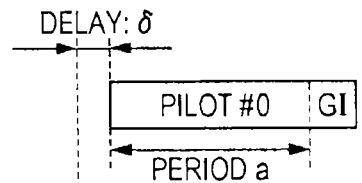
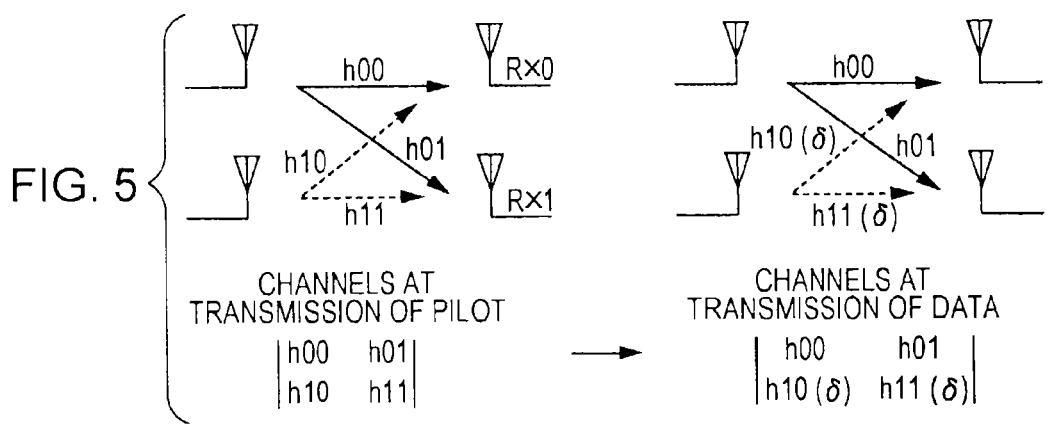
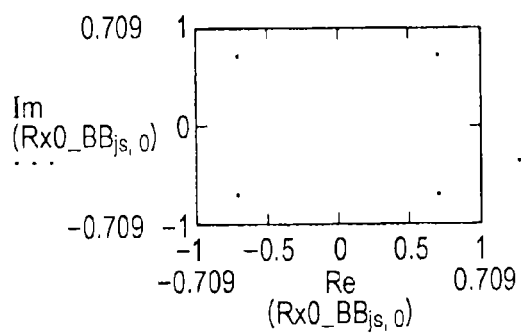
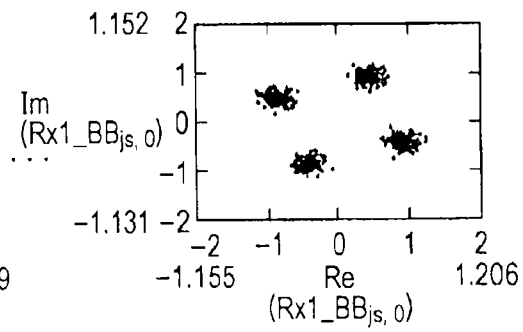

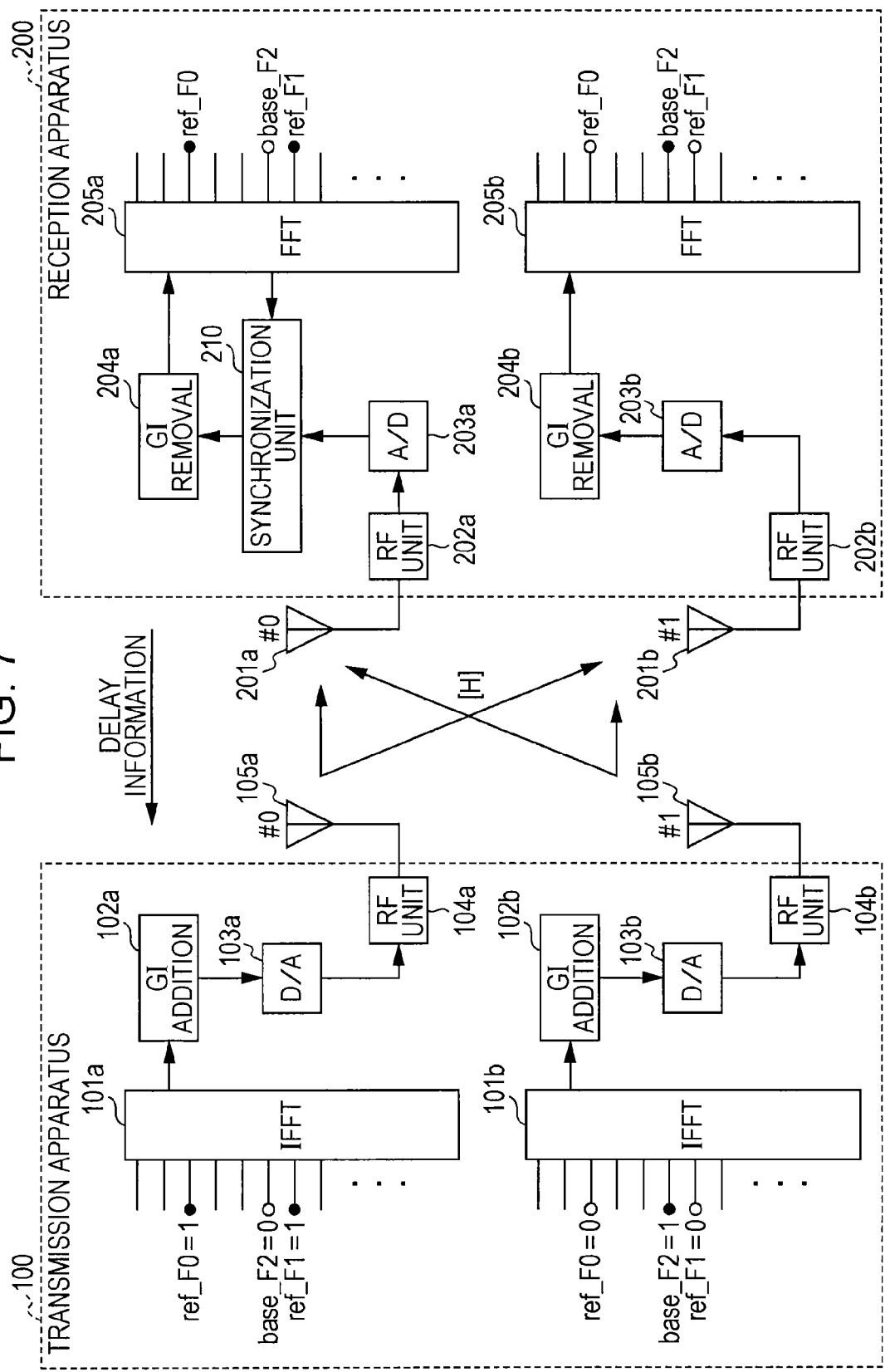

COMMUNICATION METHOD AND RECEPTION APPARATUS

CROSS REFERENCE TO RELATED APPLICATION

The present application claims the benefit of the earlier filing date of U.S. Provisional Patent Application Ser. No. 61/727,382 filed on Nov. 16, 2012, the entire contents of which is incorporated herein by reference.

BACKGROUND

1. Field of the Disclosure

The present disclosure relates to a communication method for wirelessly transmitting a signal which has been modulated in an OFDM (Orthogonal Frequency Division Multiplexing) method and a reception apparatus employing the communication method.

2. Description of Related Art

Hitherto, high-speed communication employing a modulation method using OFDM such as LTE (Long Term Evolution) or WiMAX (Worldwide Interoperability for Microwave Access) has been put into practical use. OFDM has a guard interval, and therefore, has ability to particularly address frequency selective multipath, and MIMO (multiple-input and multiple-output) is more easily implemented when compared with other modulation methods. Specifically, since signal processing is easily performed in a frequency domain using the FFT (Fast Fourier Transform), estimation of a complicated channel matrix and signal separation are easily performed. As an applied technology thereof, multiuser MIMO (MU-MIMO) for communication between a single base station and a plurality of terminals using the same frequency has been discussed.

MIMO is used for communication from a base station, that is, used for a downlink. However, a case where the MIMO is used for transmission from a mobile terminal (an uplink) in the future has been discussed. MIMO realizes high-speed communication by transmitting different signals in parallel from different antennas. However, here, it is assumed that all the signals are not delayed from one another and precisely coincide with one another in terms of time. The coincidence is realized by high-accuracy implementation of hardware in a base station. However, when MIMO transmission is performed by a mobile terminal, the precise coincidence in terms of time for individual transmission paths in the terminal is not easily realized. In a mobile terminal, high-accuracy synchronization technique is not employed due to constraint of a size and power consumption. Furthermore, in the MU-MIMO, relative delays of transmissions from terminals make MIMO transmission difficult.

In a case of reception in OFDM, an FFT frame should be reliably detected. A case where the frame detection fails will be discussed. When FFT is performed before an original start point of a frame, orthogonality of subcarriers after FFT is maintained if the original start point of the frame is within a guard interval. However, in this case, a guard interval length is deteriorated and desired avoidance of multipath is not performed. On the other hand, if a start timing of FFT is delayed from the original start point of the frame, intersymbol interference occurs in a tail portion of a signal stream and the orthogonality of subcarriers is not maintained.

Therefore, ingenious synchronization acquisition is applied to a receiver. FIG. 1 is a diagram illustrating a reception apparatus 10 which employs a modulation method using OFDM and which performs MIMO transmission.

A reception apparatus 10 of FIG. 1 has two reception paths #0 and #1. The reception path #0 has a high-frequency unit (hereinafter referred to as an "RF unit") 12a connected to an antenna 11a. A signal received by the RF unit 12a is converted into digital data by an analog/digital converter 13a. The data converted by the analog/digital converter 13a is supplied through a matched filter 14a to a correlation detector 15. The matched filter 14a detects a preamble. The correlation detector 15 detects a head position (synchronization point) of an FFT frame using autocorrelation or cross-correlation. In accordance with the head position of the FFT frame detected by the correlation detector 15, a guard interval removal unit 16a removes a guard interval from the received FFT frame.

Data from which the guard interval is removed by the guard interval removal unit 16a is supplied to an FFT unit 17a which extracts data modulated into subcarriers and supplies the extracted reception data of the path #0 to a reception data processor 18.

The reception path #1 has the same configuration as the reception path #0. Specifically, a signal received by an RF unit 12b connected to an antenna 11b is supplied to an analog/digital converter 13b, a matched filter 14b, the correlation detector 15, a guard interval removal unit 16b, and an FFT unit 17b in this order, and reception data of the path #1 is supplied to the reception data processor 18.

SUMMARY

As illustrated in FIG. 1, in the MIMO reception apparatus, calculation of the autocorrelation or the cross-correlation is performed by the correlation detector 15 by collecting signals of the reception branches. Such a process is performed assuming that timings and frequencies of signals supplied from a plurality of antennas on a transmission side precisely coincide with one another.

However, it is expected that precision of timings and frequencies of signals supplied from a plurality of antennas on a transmission side is not maintained when MIMO transmission is performed on an uplink from here on. Specifically, in a case where a mobile terminal performs MIMO transmission, transmission signals output from a transmission data processing system included in the mobile terminal may differently delay when arriving at antennas of channels and synchronization between the antennas is not realized. Examples of elements of the different delays include a difference of group delays of power amplifiers, a difference of group delays of transmission bandpass filters, and a difference of group delays of various notch filters and matching circuits.

For example, in a case of power amplifiers, different group delays are obtained depending on active elements included in the amplifiers. Furthermore, even in a case of power amplifiers having the same configuration, different group delays are obtained depending on temperature or applied voltages. Between two antennas, a difference between group delays is several n seconds.

A group delay of a transmission bandpass filter is approximately 10 n seconds, and considerably depends on a passband or an ambient temperature.

Performances of various notch filters considerably depend on performances of used components. A determination as to whether the various notch filters are to be provided to suppress pre-interference components to other bands is made depending on individual situations of paths. A matching circuit is provided taking characteristics of elements into consideration so as to satisfy characteristics among the elements. A configuration and the number of components of the matching circuit are not fixed and matching circuits of two paths should have different configurations in many cases. In this case, if a delay amount is recognized in advance, a phase correction may be performed for recovery. However, in general, different mobile terminals have different delay amounts and a delay amount changes depending on temperature or with age, and accordingly, it is difficult to estimate a delay amount. Furthermore, a relative delay may occur between two transmission paths depending on ambient environment of antennas of a mobile terminal. The term "ambient environment" here means influence from a body of a person who has the mobile terminal, for example.

When 2×2 MIMO reception is performed, a difference of a transmission delay between two antennas when the two antennas of a mobile terminal is viewed from a base station may be ignored. However, multi-paths having extremely similar transmission distances may be expected and a relative delay of the multi-paths may be generated.

Accordingly, approximately 20 n seconds of a relative delay should be assumed at maximum, and the value is shorter than a unit time of the fast Fourier transform (FFT) in a case of the LTE since a unit time length for performing the FFT is approximately 32 n seconds. The time detection will now be described.

FIG. 2 is a diagram illustrating characteristics of the square of autocorrelation of a Zadoff-chu system (one of CAZAC systems: Constant Amplitude Zero Auto-Correlation) used in the LTE. In FIG. 2, an axis of abscissa denotes a unit time of IFFT (Inverse Fast Fourier Transform). For example, when an IFFT size is 1000, numbers from 1 to 1000 are shown. In this specification, the unit time representing the IFFT size is referred to as an "IFFT chip" (or simply referred to as a "chip").

In FIG. 2, a timing of 0 at the center of the axis of abscissa corresponds to a state in which the square of the autocorrelation is not shifted at all. In FIG. 2, amplitude of a reception signal in the state in which the square of autocorrelation is not shifted at all is determined to be 0 dB. Change of a shift represents a state of attenuation of a reception signal.

As illustrated in FIG. 2, when the square of the autocorrelation is obtained and the time unit of the IFFT is shifted by one (one chip shift of the IFFT), a reception signal is attenuated by approximately 4 dB. Furthermore, when the time unit is shifted by two chips, the reception signal is attenuated by 20 dB or more. Accordingly, when the time unit is shifted by one chip or more, an attenuation amount is large and the IFFT chip can be specified at high accuracy.

FIGS. 3A-3D illustrate specifying of an FFT frame of a reception signal when the square of autocorrelation is employed.

FIGS. 3A-3C represent images of reception streams which have been subjected to the IFFT. Numbers in the streams represent numbers of IFFT chips.

Stream #0 of FIG. 3A and stream #1 of FIG. 3B reach reception ends at substantially the same time and a relative delay is δ which is within one chip. A difference of the relative delay is not specified by a reception side. Stream #2 of FIG. 3C is delayed due to multipath, and one of two transmission antennas which transmits the stream #2 is not identified. Stream #2 is delayed by three IFFT chips, and a head of the stream #2 coincides with a head of one of IFFT chips of the stream #0 by chance.

FIG. 3D shows an output of a correlator in a case where these signals are received and an FFT frame is detected using autocorrelation of a preamble. Since correlated calculation is performed in a unit of IFFT chip, a time shift within one chip is not reliably detected. In FIG. 3D, a time point t0 when the streams #0 and #1 are to be detected and in which the output of the correlator is high has a width.

A receiver is not capable of specifying a factor of such a relative delay. Such a width deteriorates accuracy of synchronization acquisition. As for the stream #2, a head can be reliably detected by the output of the correlator at the time point t1.

In order to correct the relative delay, Japanese Unexamined Patent Application Publication No. 2006-295629 describes a method for cancelling a relative delay by detecting a phase difference of RF carriers, for example. Furthermore, Japanese Unexamined Patent Application Publication No. 2012-503429 describes a method for correcting a relative delay using initial synchronization of preambles in the MU-MIMO. However, more reliable correction of a relative delay is desired.

Furthermore, channel estimation is also a problem to be solved.

In MIMO, channels are represented by determinant of matrix (hereinafter referred to as an "H-matrix"). An H-matrix is estimated using a pilot signal included in a transmission signal and the signal is separated. Here, there arises a problem in that, when FFT frames of transmission signals shift from one another due to a relative delay, if the FFT frames are fixed to a certain point, pilot signals are not reliably demodulated. The pilot signals are arranged so that frequencies and time frames of the OFDM are not overlapped with one another in a plurality of transmission paths. Therefore, if FFT frames including pilot signals are specified by a certain method, the pilot signals are reliably obtained.

Specifically, in a reception path #0 illustrated in FIG. 4A and a reception path #1 illustrated in FIG. 4B, FFT frames including pilot signals are arranged at different timings. Here, "GI" denotes a guard interval. In this example, when signals are transmitted from the two reception paths #0 and #1 on a transmission side, a relative delay is approximately 4 n seconds. Furthermore, in the reception path #0, a period a in which the pilot signal is transmitted is detected and demodulation is performed in synchronization with the timing. Similarly, in the reception path #1, a period b in which the pilot signal is transmitted is detected and demodulation is performed in synchronization with the timing. The transmission signals in this example are modulated by the QPSK (Quadrature Phase Shift Keying).

When the reception illustrated in FIGS. 4A and 4B is performed, MIMO channels are represented by a matrix form illustrated in a lower left portion of FIG. 5. In the path #0, "h00" and "h01" are estimated and in the path #1, "h10" and "h11" are estimated. Here, a time delay between the two paths is not reflected on reception pilot signals since frame synchronization is performed. Data reception is now performed, and data is simultaneously transmitted in the two paths in terms of time. The data is demodulated by separating signals of the two paths using an inverse matrix of the H-matrix obtained before. Here, as illustrated in FIGS. 4A-4B, since delays δ between the paths are included in the reception data of the two paths, the demodulation is performed taking a phase shift into consideration, and therefore, the signal separation is not reliably performed. Specifically, the signal separation taking the delays δ into consideration is performed using the H-matrix which does not take the delays δ into consideration.

An example of constellation of a result of the reception and the demodulation is shown in FIGS. 6A and 6B. FIG. 6A shows a case of an ideal reception state. In this ideal state, reception symbols are fixed in four positions. On the other hand, when the signal separation taking the delays δ into consideration is performed, positions of reception symbols are not fixed as illustrated in FIG. 6B and demodulation fails.

In addition, optimization by precoding is a further problem to be solved. In the precoding, a communication path capacity of MIMO is determined to be maximum in many cases. In a closed loop, a transmission side is multiplied by a beamforming matrix and a reception side is multiplied by a waveshaping matrix. In the closed loop, a method referred to as CDD (Cyclic Delay Diversity) is used and a method for ensuring a communication path capacity by performing certain phase rotation is employed. In either method, phases of transmission signal streams are controlled. However, when a relative delay described above is generated, an H-matrix appears as phase rotation, and therefore, information on the H-matrix which appears as phase rotation should be taken into consideration.

These problems are solved if the relative delay (δ) is detected. Specifically, when the relative delay (δ) is added to estimation of the H-matrix, channel estimation may be reliably performed. Furthermore, reliably precoding may be performed.

The inventor recognizes necessity of detection of a relative delay when MIMO communication is performed.

According to an exemplary embodiment, the disclosure is directed to an electronic device that digitizes a baseband signal obtained from a received high-frequency signal; specifies a position of a preamble included in the digitalized signal; calculates a square of the preamble; specifies a peak from a value obtained by the square of the preamble; performs a fast Fourier transform (FFT) on the baseband signal using a position of the peak as a start of an FFT window; extracts phases of a plurality of frequency components for phase measurement from the baseband signal which has been subjected to the FFT; obtains a phase difference of the plurality of phases; and obtains a phase correction value of a reception signal using the phase difference and a phase reference According to the present disclosure, relative delays within one IFFT chip which are generated among a plurality of transmission streams in the MIMO may be detected. This is considerably effective.

BRIEF DESCRIPTION OF DRAWINGS

FIGS. 4A-4B illustrate a delay generation state of signals of two reception paths.

FIG. 5 is a diagram illustrating channel estimation of the MIMO.

FIGS. 6A and 6B illustrate a reception state of the MIMO when a transmission delay is generated in channels.

FIG. 7 is a block diagram illustrating an outline of a first embodiment of the present disclosure.

DETAILED DESCRIPTION

Figure 1:
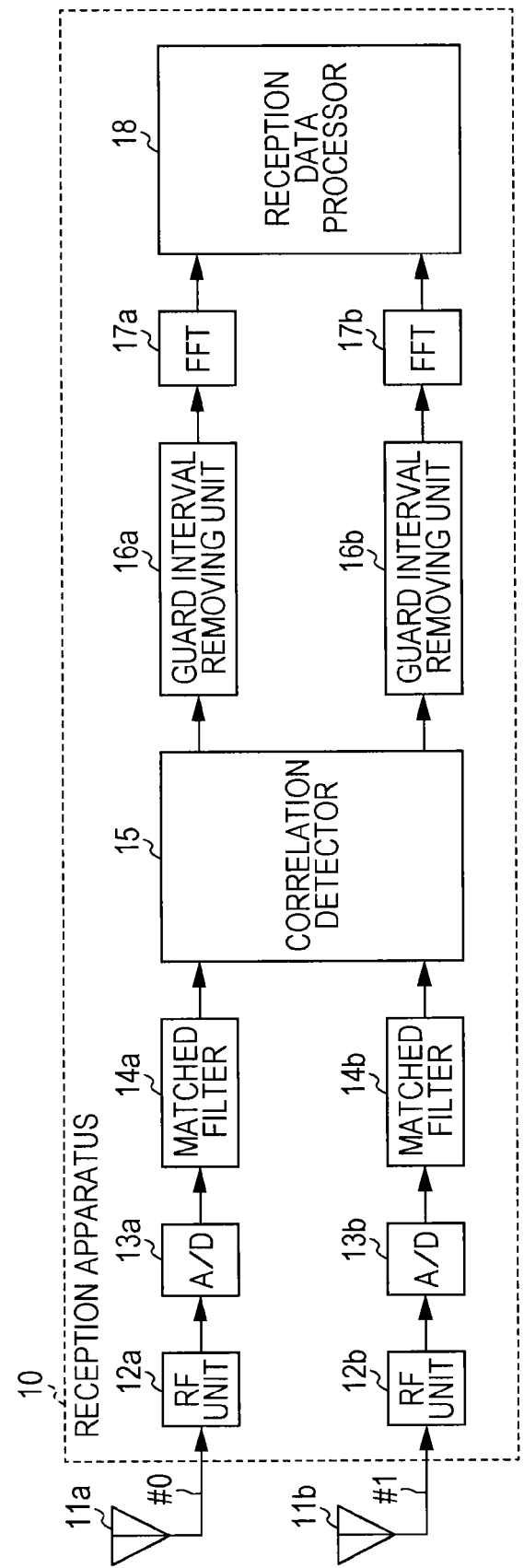
FIG. 1 is a block diagram illustrating a conventional MIMO reception apparatus.
Figure 2:
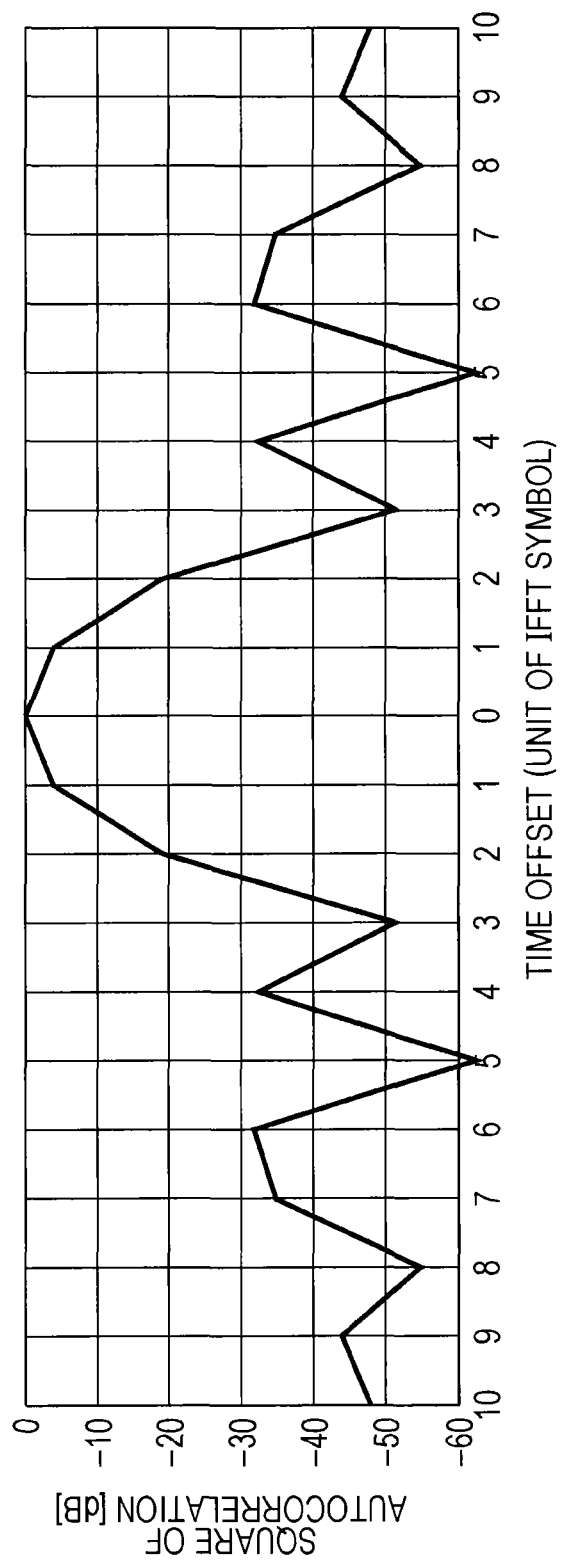
FIG. 2 is a diagram illustrating characteristics of the square of autocorrelation of a reception signal.

Embodiments of the present disclosure will be described hereinafter with reference to FIGS. 7 to 15 in the following order.
1. First Embodiment
1-1. Outline of First Embodiment (FIG. 7)
1-2. Example of Configuration of Reception Apparatus of First Embodiment (FIG. 8)
1-3. Operation of Reception Apparatus of First Embodiment (FIGS. 9 and 10)
1-4. Example of Signal Assignment (FIG. 11)
1-5. Example of Correction of Relative Delay Using Phase Correction Value (FIG. 12)
2. Second Embodiment
2-1. Example of Configuration of Reception Apparatus of Second Embodiment (FIG. 13)
2-2. Operation of Reception Apparatus of Second Embodiment (FIG. 14)
2-3. Example of Signal Assignment (FIG. 15)
2-4. Example of Correction of Relative Delay Using Phase Correction Value (FIG. 16)
3. Modifications
1. First Embodiment
[1-1. Outline of First Embodiment]

FIG. 7 is a diagram illustrating an outline of a first embodiment.

An example of FIG. 7 shows a case where a signal transmitted from a transmission apparatus 100 is received by a reception apparatus 200. The transmission apparatus 100 is a terminal device such as a cellular phone terminal device. The reception apparatus 200 is a base station which performs communication with the terminal device. The example of FIG. 7 shows a case of 2×2 MIMO.

The transmission apparatus 100 includes IFFT units 101a and 101b which perform inverse fast Fourier transform.

At a time of synchronization acquisition, a signal for synchronization acquisition is assigned to three specific frequency components ref_F0, ref_F1, and base_F2 to be subjected to the inverse fast Fourier transform performed by the IFFT units 101a and 101b. The assignment of the signal for synchronization acquisition is performed under control of a communication controller included in the transmission apparatus 100.

In this embodiment, when the synchronization acquisition is performed, the signal for synchronization acquisition is assigned to frequency components denoted by black circles among a plurality of frequency components to be supplied to the IFFT units 101a and 101b in FIG. 7.

Specifically, data "1" which is the signal for synchronization acquisition is supplied to the two frequency components ref_F0 and ref_F1, and data "0" is supplied to the frequency component base_F2 in the IFFT unit 101a in a first transmission path.

Furthermore, data "1" which is the signal for synchronization acquisition is supplied to the frequency components base_F2, and data "0" is supplied to the remaining two frequency components ref_F0 and ref_F1 in the IFFT unit 101b in a second transmission path.

Figure 11:
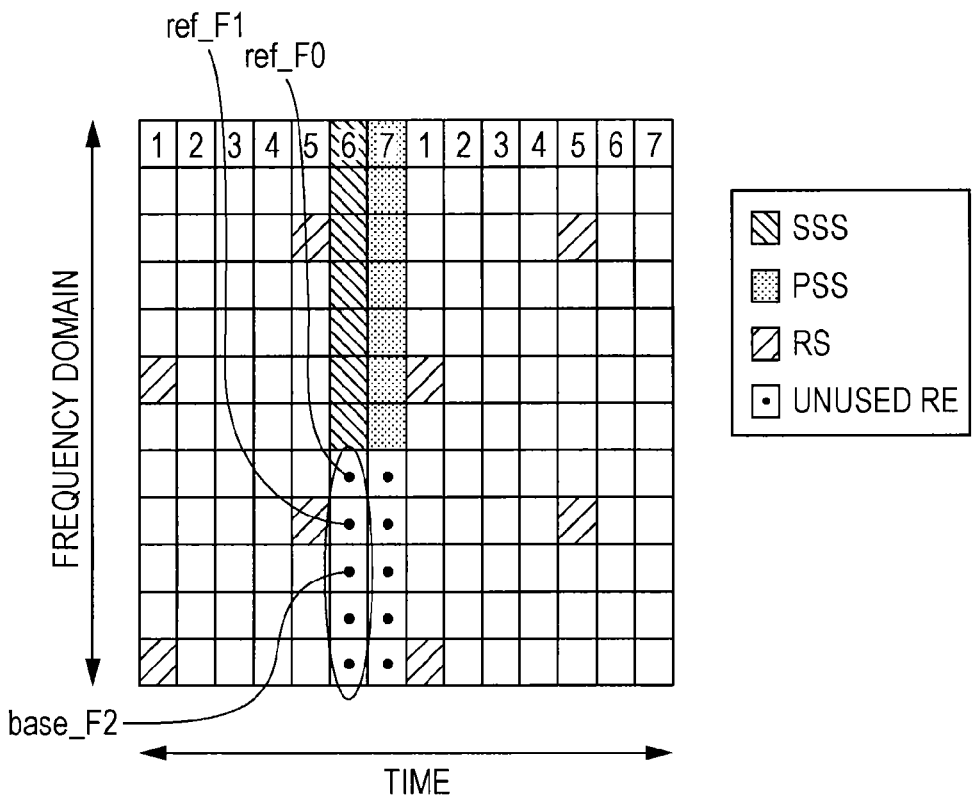
FIG. 11 is a diagram illustrating signal assignment according to the first embodiment of the present disclosure.

Note that slots used for the three frequency components ref_F0, ref_F1, and base_F2 are consecutively arranged in a frequency direction in a time/frequency grid for one transmission frame. Furthermore, the three frequency components use unused slots which are the same, in terms of time, as a slot to which a preamble is assigned. An example of a use state of the time/frequency slot for one transmission frame will be described hereinafter in detail (FIG. 11).

The three different frequency components are used as the signal for synchronization acquisition so that orthogonality among the frequency components is maintained and interference is avoided if multipath delay is within a guard interval when the reception apparatus performs the fast Fourier transform.

Signals which have been subjected to the inverse fast Fourier transform performed by the IFFT units 101a and 101b are supplied to guard interval addition units 102a and 102b which add a guard interval. The guard interval addition units 102a and 102b perform parallel/serial conversion for converting the outputs of the IFFT units 101a and 101b into serial data.

The transmission signals output from the guard interval addition units 102a and 102b are supplied through digital/analog converters 103a and 103b to RF units 104a and 104b, respectively. The RF units 104a and 104b perform frequency conversion on the transmission signals so as to obtain predetermined transmission frequencies. Then the transmission signals of paths #0 and #1 are wirelessly transmitted from antennas 105a and 105b connected to the RF units 104a and 104b.

The two transmission signals output from the transmission apparatus 100 are transmitted through a space, and arrive at the reception apparatus 200 in a state in which the two signals are interfered (deformed) due to a channel matrix (H-matrix).

The reception apparatus 200 includes two antennas 201a and 201b. Reception signals of the antennas 201a and 201b are supplied to RF units 202a and 202b, and signals having a predetermined transmission frequency are subjected to frequency conversion so that baseband signals are obtained. The baseband signals obtained by the RF units 202a and 202b are supplied to analog/digital converters 203a and 203b which convert the baseband signals into digital signals.

Figure 8:
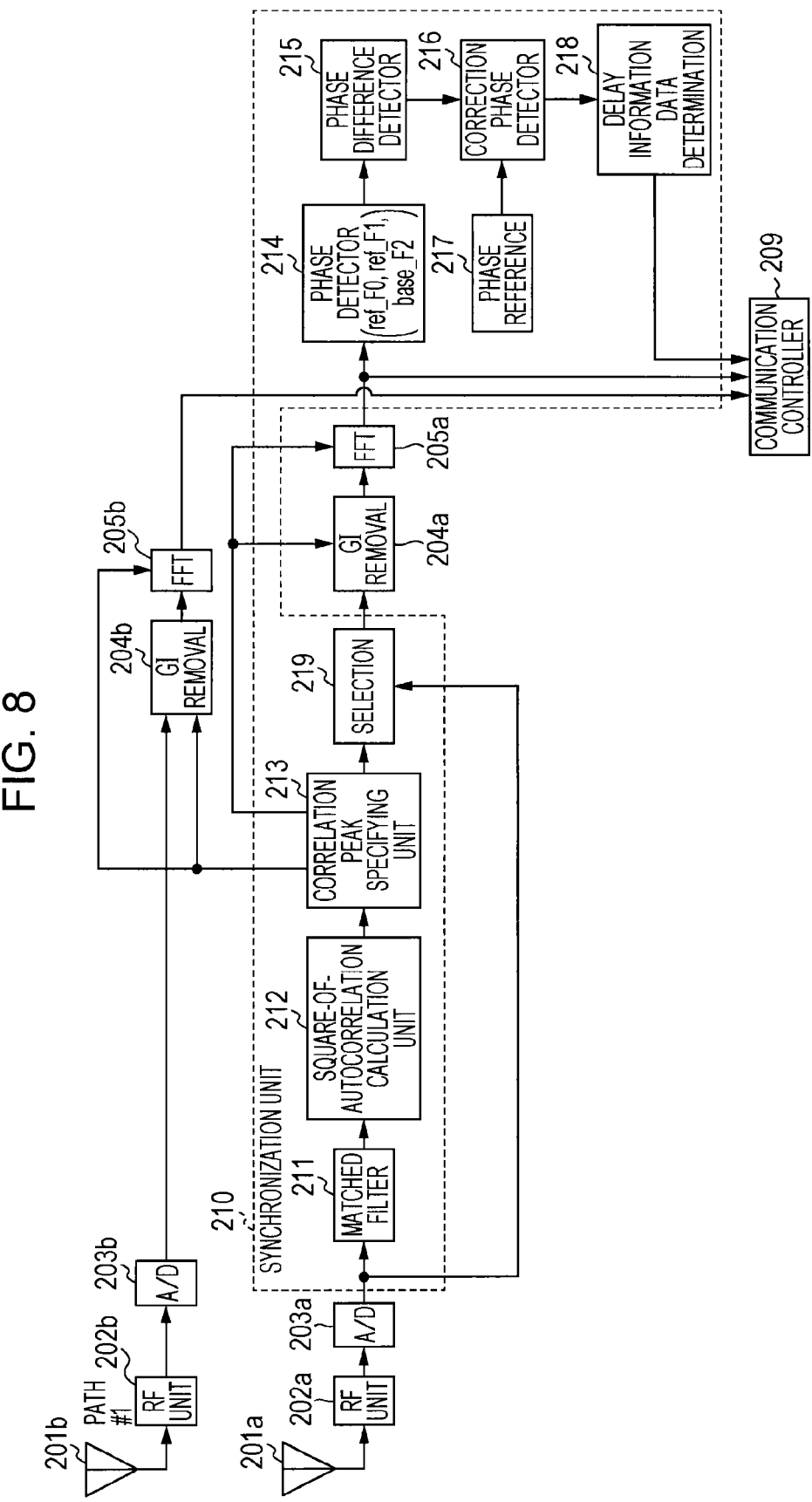
FIG. 8 is a block diagram illustrating a configuration of a reception apparatus according to the first embodiment of the present disclosure.

The reception signal output from the analog/digital converter 203a of a first reception system is supplied to a synchronization unit 210. The synchronization unit 210 performs a process of detecting delay information of the reception signals of the two paths #0 and #1. The synchronization unit 210 performs a synchronization acquisition process as well as a process performed on a signal which has been subjected to the fast Fourier transform performed by an FFT unit 205a which will be described hereinafter. Only one of the two reception systems includes the synchronization unit 210. Furthermore, the synchronization unit 210 is used when the synchronization acquisition process is performed, and a signal input to the synchronization unit 210 is simply output when a data demodulation process is performed. A configuration of the synchronization unit 210 will be described hereinafter in detail (FIG. 8).

The reception signal output from the synchronization unit 210 is supplied to a guard interval removal unit 204a. Furthermore, the reception signal output from the analog/digital converter 203a of the second reception system is supplied to a guard interval removal unit 204b. The reception signals from which guard intervals are removed by the guard interval removal units 204a and 204b of the respective reception systems are supplied to the FFT unit 205a and an FFT unit 205b, respectively. Note that the guard interval removal units 204a and 204b perform serial/parallel conversion for converting outputs of the FFT units 205a and 205b into parallel data, and the converted data is supplied to the FFT units 205a and 205b.

The FFT units 205a and 205b perform the fast Fourier transform. Signals which have been subjected to the fast Fourier transform performed by the FFT units 205a and 205b are extracted as reception signals. At the time of synchronization acquisition, the three specific frequency components ref_F0, ref_F1, and base_F2 among frequency components subjected to the fast Fourier transform performed by the FFT unit 205a are used for a synchronization acquisition process. At the time of synchronization acquisition, the signal output from the FFT unit 205a is supplied to the synchronization unit 210 which performs the synchronization acquisition process.

In FIG. 7, a configuration of the reception process after the FFT units 205a and 205b is omitted.

[1-2. Example of Configuration of Reception Apparatus of First Embodiment]

FIG. 8 is a diagram illustrating a configuration of the reception apparatus 200. Only a configuration relating to the synchronization acquisition is shown in FIG. 8.

A digital signal output from the analog/digital converter 203a of the first reception path of the reception apparatus 200 is supplied to the synchronization unit 210. The reception signal supplied to the synchronization unit 210 is supplied to a matched filter 211. The matched filter 211 specifies a position of a preamble included in the reception signal. An output of the matched filter 211 is supplied to a square calculation unit 212 which performs calculation of the square of autocorrelation. An output of the square calculation unit 212 is supplied to a correlation peak specifying unit 213. The correlation peak specifying unit 213 specifies a peak position of a value of the square of autocorrelation.

Then an output of the correlation peak specifying unit 213 is supplied to the guard interval removal unit 204a through a selection unit 219. The guard interval removal unit 204a removes a guard interval and performs parallel conversion on the signal, and the converted signal is supplied to the FFT unit 205a.

The signal which has been subjected to the fast Fourier transform performed by the FFT unit 205a is supplied to a phase detector 214. The phase detector 214 detects phases of the three specific frequency components ref_F0, ref_F1, and base_F2. Information on the phases detected by the phase detector 214 is supplied to a phase difference detector 215. The phase difference detector 215 detects a difference among the phases of the three frequency components.

Information on the difference among the phases of the three frequency components detected by the phase difference detector 215 is supplied to a correction phase detector 216. The correction phase detector 216 obtains a phase to be corrected using a reference phase stored in a phase reference generation unit 217 in advance and the phase difference detected by the phase difference detector 215. A value of the phase to be corrected calculated by the correction phase detector 216 is supplied to a delay information data determination unit 218 which determines delay information used to perform the synchronization acquisition of the reception signal. Conditions required for the determination of the delay information performed by the delay information data determination unit 218 will be described hereinafter.

The delay information is supplied to a communication controller 209. The communication controller 209 determines a delay between the two reception paths in accordance with the supplied delay information when performing data demodulation. Then the communication controller 209 sets a start point of an FFT window when the guard interval removal units 204a and 204b in the respective reception paths remove a guard interval or when the FFT units 205a and 205b perform the fast Fourier transform.

[1-3. Operation of Reception Apparatus of First Embodiment]

Next, examples of the synchronization acquisition process and the data demodulation process performed by the reception apparatus 200 will be described with reference to flowcharts in FIGS. 9 and 10. Note that, in this example, the transmission apparatus 100 assigns a signal for synchronization acquisition to the sixth time slot in one transmission frame, and the synchronization unit 210 of the reception apparatus 200 detects the signal for synchronization acquisition from the sixth time slot. A preamble is assigned to the sixth time slot.

Figure 9:
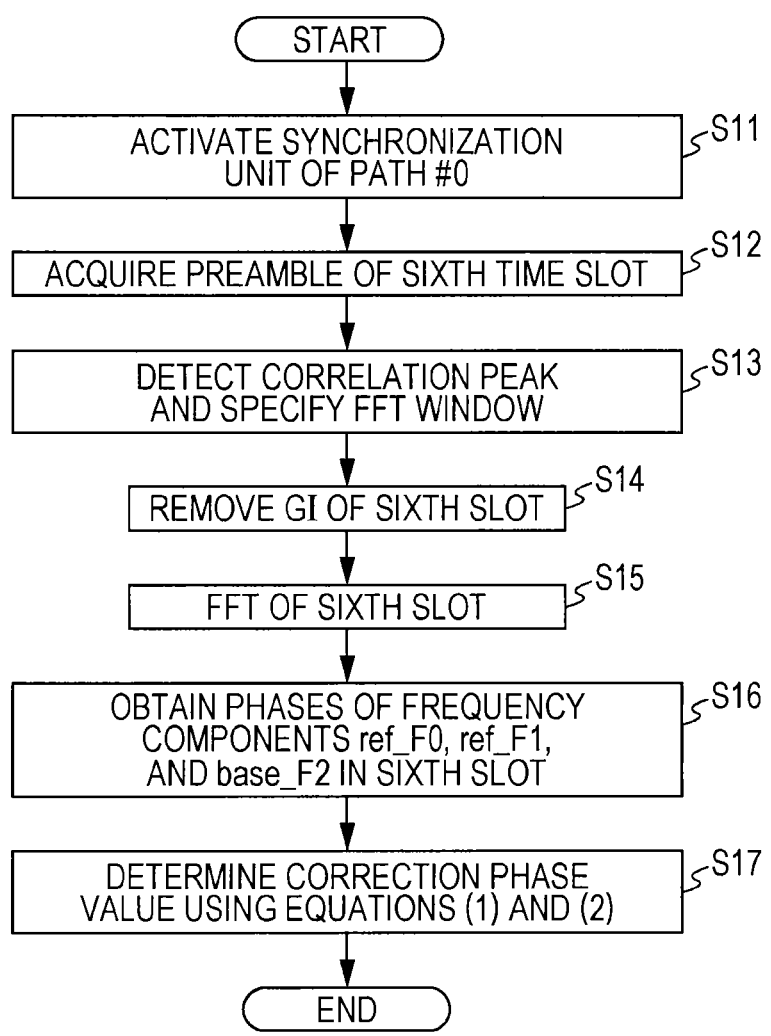
FIG. 9 is a flowchart illustrating a synchronization acquisition process according to the first embodiment of the present disclosure.

FIG. 9 is a flowchart illustrating the synchronization acquisition process performed by the reception apparatus 200.

Figure 3A:
FIGS. 3A-3D illustrate a transmission state of MIMO.
Figure 3B:
Figure 3C:
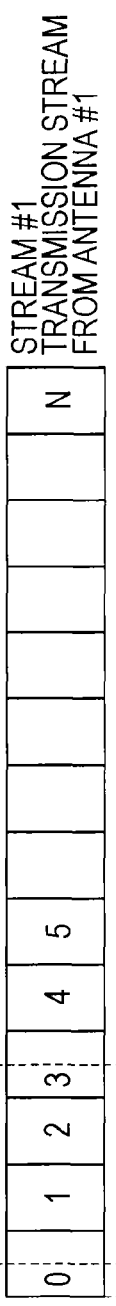
Figure 3D:
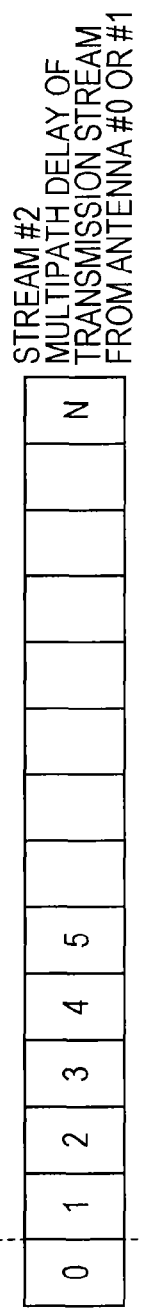

First, the communication controller 209 activates the synchronization unit 210 of the first reception path #0 (in step S11). Then the matched filter 211 acquires the preamble assigned to the sixth time slot (in step S12). When the matched filter 211 acquires the preamble, the correlation peak specifying unit 213 detects a correlation peak of the preamble and specifies a start point of an FFT window (in step S13). Note that the start point detected here may have an error in terms of time as illustrated as the time t0 of FIG. 3D, for example.

Next, the guard interval removal unit 204a removes a guard interval at a timing when the correlation peak specifying unit 213 performs the detection (in step S14). The FFT unit 205a performs the fast Fourier transform on the signal of the sixth time slot from which the guard interval has been removed (in step S15).

The signal which has been subjected to the fast Fourier transform is supplied to the phase detector 214 which detects the phases of the three frequency components ref_F0, ref_F1, and base_F2 (in step S16). In accordance with information on the phases detected by the phase difference detector 215, the delay information data determination unit 218 determines a phase difference corresponding to a relative delay of the frequency component base_F2 (in step S17).

When the phase difference is determined in step S17, Equations (1) and (2) below are used.

$$\text{Phase Difference} = \frac{\text{Phase of ref\_F1} - \text{Phase of ref\_F0}}{\text{ref\_F1} - \text{ref\_F0}} \times \quad \text{Equation (1)}$$
$$(\text{base\_F2} - \text{ref\_F0}) - \text{Phase of base\_F2}$$

An object of this calculation equation is described as follows. Although information on the delay is included in the phase of the frequency component base_F2, a relative value relative to the path #0 is required, and therefore, the frequency components ref_F0 and ref_F1 are used. Since an absolute value of the phase difference includes an offset caused by a transmission length and multipath, the phase of the frequency component base_F2 is interpolated or extrapolated by the phase difference detector 215 using a difference of two waves of the frequency components ref_F0 and ref_F1.

Furthermore, if the delay amount is equal to or larger than one IFFT chip, separation may be performed by the synchronization acquisition using the preamble, and therefore, the following calculation is performed in order to perform subtraction.

$$\text{Phase Correction Value} = \text{mod}\left(\frac{\text{Phase Difference}}{\text{Phase Reference}}\right) \quad \text{Equation (2)}$$

In Equation (2), "mod" represents a residue of the division. Here, the following equation is used.

$$\text{Phase Reference} = \frac{360 \times \text{ref\_F0}}{\text{IFFT Size}} \quad \text{Equation (3)}$$

The calculation of Equation (2) is performed by the correction phase detector 216, for example. The phase reference in Equation (3) is stored in the phase reference generation unit 217.

The delay information data determination unit 218 converts the phase correction value thus obtained into a time value so as to obtain a relative delay. The relative delay is supplied from the delay information data determination unit 218 to the communication controller 209. The communication controller 209 performs correction using the relative delay taking a time difference corresponding to timings of reception processes of the two reception paths into consideration.

Alternatively, a value of the relative delay obtained by the communication controller 209 is supplied from the reception apparatus 200 to the transmission apparatus 100. The transmission apparatus 100 which receives the value of the relative delay corrects a transmission timing of one of the two transmission paths by a time corresponding to the relative delay. By performing this correction, transmission may be performed without a relative delay.

Figure 10:
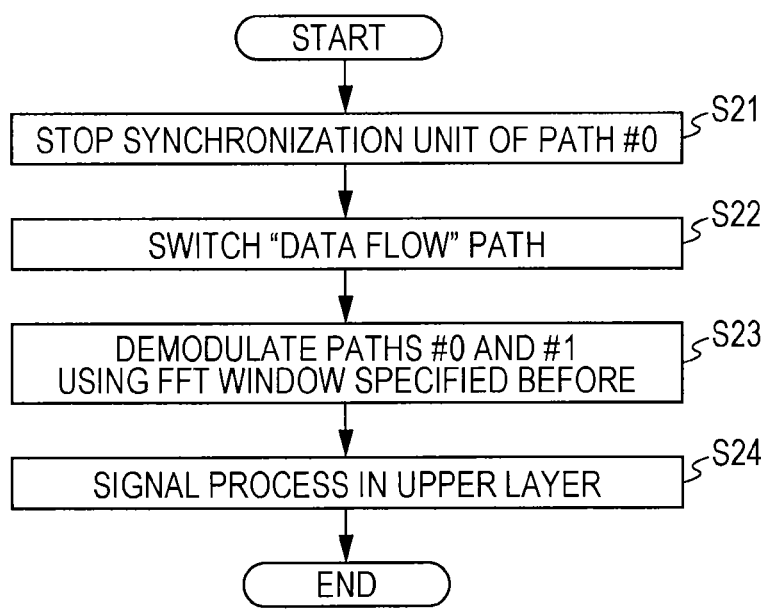
FIG. 10 is a flowchart illustrating a data demodulation process according to the first embodiment of the present disclosure.

FIG. 10 is a flowchart illustrating a process performed when data is demodulated after the synchronization acquisition is completed.

First, the communication controller 209 stops the synchronization unit 210 of the path #0 (in step S21). The selection unit 219 selects an output of the analog/digital converter 203a and performs switching to a path which does not include the synchronization unit 210 (in step S22).

Then, at a timing of the FFT window specified by the process of the flowchart of FIG. 9, reception processes are performed by the two reception paths #0 and #1 and a process of demodulating reception data is performed (in step S23). Furthermore, the reception data obtained through the demodulation is supplied to an upper layer, and the reception data is processed in the upper layer (in step S24).

[1-4.Example of Signal Assignment]

FIG. 11 is a diagram illustrating use of slots included in the time/frequency grid in one transmission frame.

In FIG. 11, a case where three slots included in the grid standardized for the LTE are assigned to the three frequency components ref_F0, ref_F1, and base_F2 is shown. As illustrated in FIG. 11, SSSs (Secondary Synchronization Signals) are assigned to a number of frequency slots of the sixth time slot. Furthermore, PSSs (Primary Synchronization Signals) are assigned to a number of frequency slots of the seventh time slot. The SSSs and the PSSs function as preambles. In the standard of the LTE, slots included in the sixth and seventh time slots to which the SSSs or the PSSs are not assigned are unused slots. Note that one slot includes twelve subcarriers.

Furthermore, RSs (Reference Signals) are assigned to a number of frequency slots of the first and fifth time slots.

Here, in this embodiment, the three frequency components ref_F0, ref_F1, and base_F2 are assigned to consecutive frequency slots in the unused slots of the sixth time slot.

As described above, according to this embodiment, a relative delay among a plurality of MIMO transmission streams within one IFFT chip may be detected. Using the detected relative delay, correction of a reception signal on a reception apparatus side or correction of a transmission signal on a transmission apparatus side can be performed.

[1-5. Example of Correction of Relative Delay Using Phase Correction Value]

Figure 12:
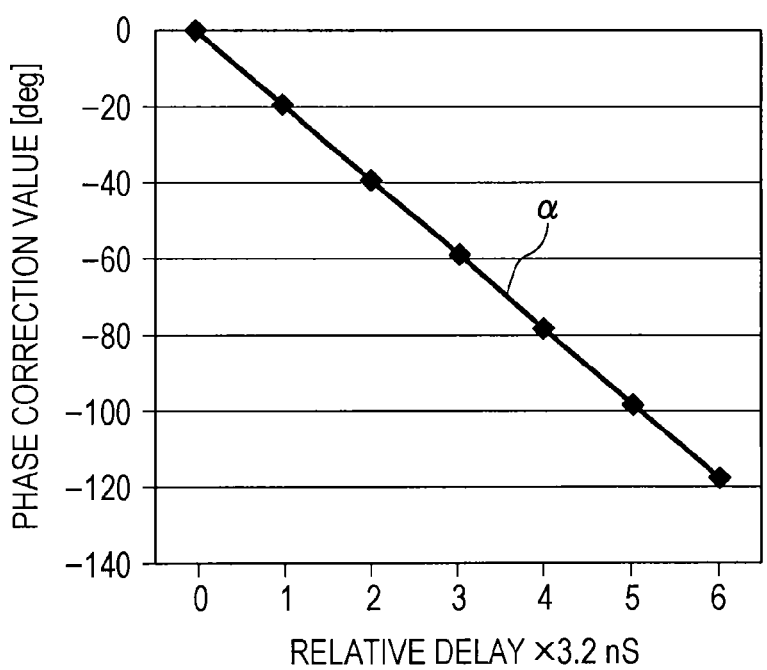
FIG. 12 is a diagram illustrating the relationship between a phase correction value and a relative delay according to the first embodiment of the present disclosure.

FIG. 12 is a diagram illustrating simulation of a result of a phase correction value. The simulation is performed taking the multipath into consideration. Specifically, hundred scattering points are assigned in a portion in the vicinity of a reception point, amplitude and a phase are randomly change due to scattering, and a ray tracing method is employed from the scattering points to the reception point. Such a multipath model represents Rayleigh distribution.

It is assumed that an IFFT size is 200, the frequency component ref_F0 is 100, the frequency component ref_F1 is 110, and the frequency component base_F2 is 109 in the simulation illustrated in FIG. 12. Assuming the case of application to the LTE, a result of the relative delay from 3.2 nS to 19.2 nS is shown in FIG. 12. In FIG. 12, an axis of abscissa denotes the relative delay and an axis of ordinate denotes a phase correction value. In the relative delay in the axis of abscissa, a value 1 is 3.2 nS. A characteristic a in which the phase delay linearly increases as the relative delay increases is shown in FIG. 12. For example, a phase change of approximately 20 degrees is shown relative to the relative delay of 3.2 nS.

When values of the frequency components ref_F0 and ref_F1 are reduced, inclination of the characteristic α in FIG. 12 becomes approximately flat and resolution capability depending on a phase is deteriorated. Furthermore, if the frequency selective multipath affects the frequency components ref_F0, ref_F1, and base_F2, the characteristic α does not become a straight line.

<2. Second Embodiment>

[2-1. Example of Configuration of Reception Apparatus of Second Embodiment]

Figure 13:
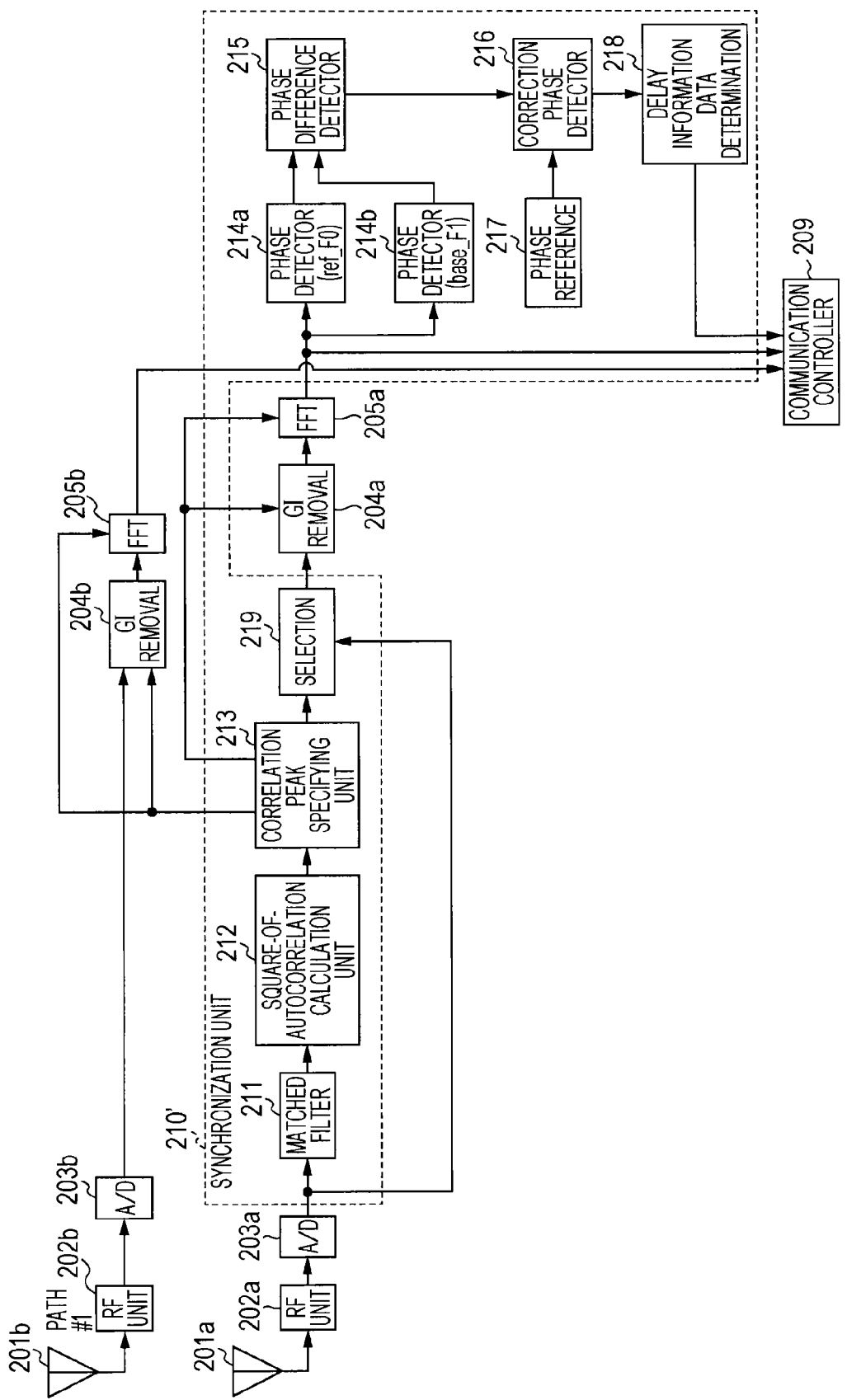
FIG. 13 is a block diagram illustrating a configuration of a reception apparatus according to a second embodiment of the present disclosure.
Figure 14:
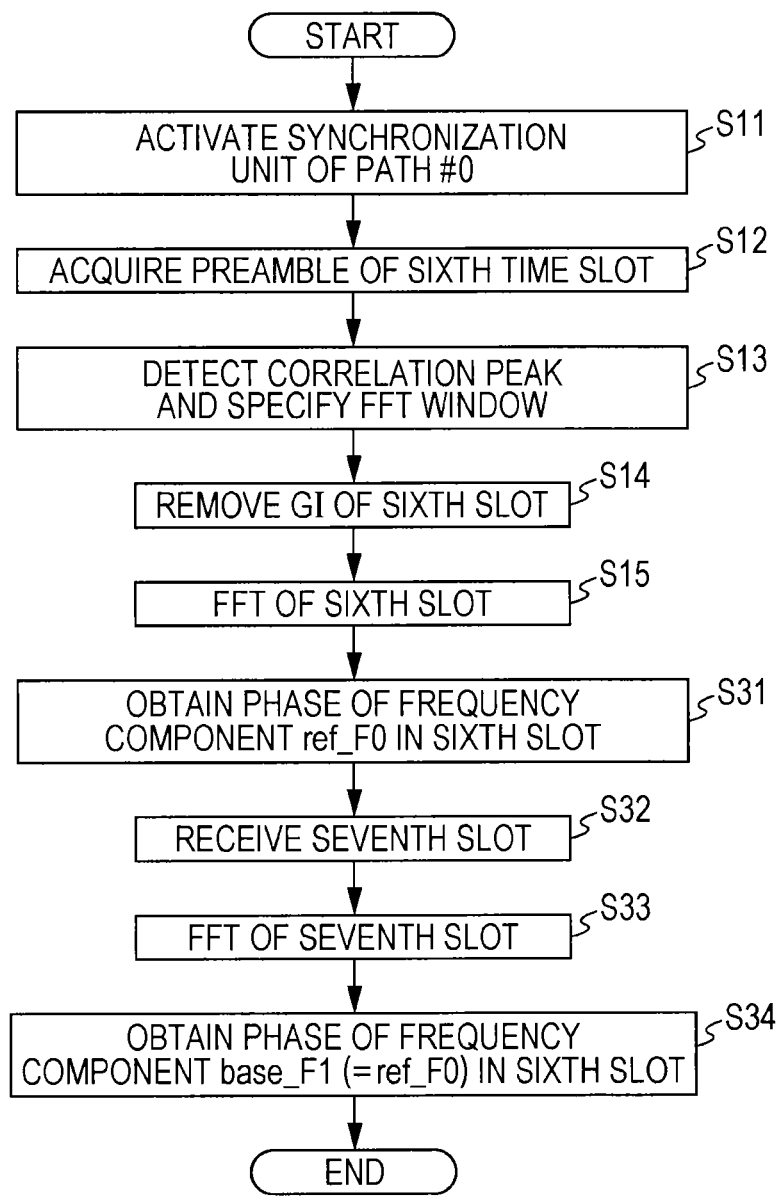
FIG. 14 is a flowchart illustrating a synchronization acquisition process performed by the reception apparatus according to the second embodiment of the present disclosure.
Figure 15:
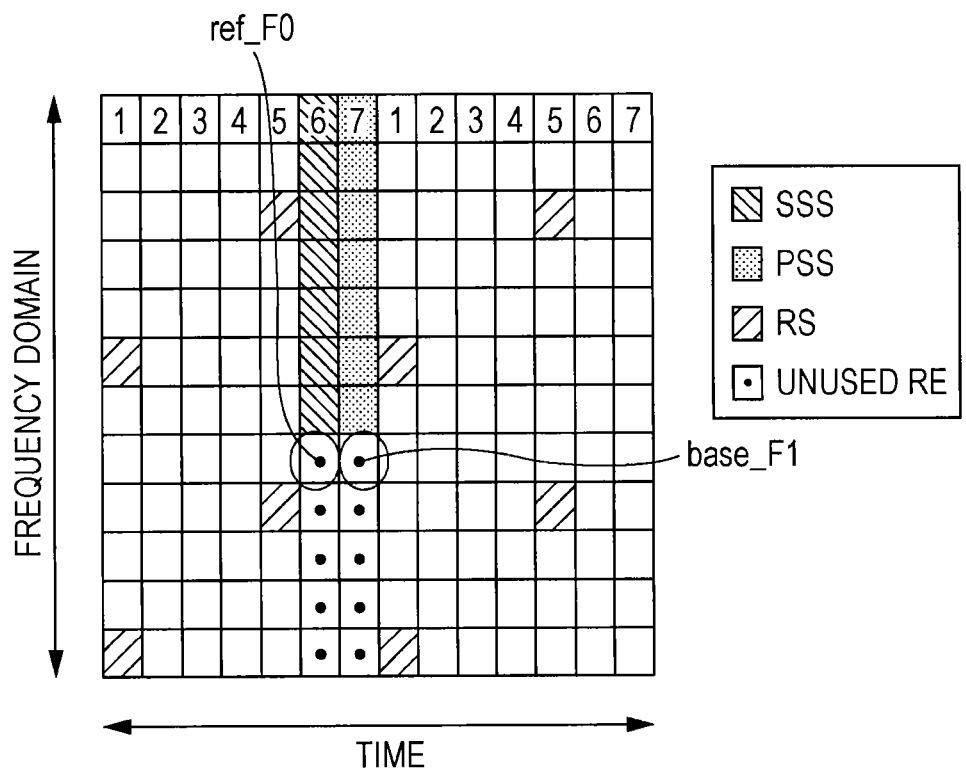
FIG. 15 is a diagram illustrating signal assignment according to the second embodiment of the present disclosure.

Next, a second embodiment of the present disclosure will be described with reference to FIGS. 13 to 15. In FIGS. 13 to 15, components the same as those illustrated in FIGS. 7 to 12 described in the first embodiment are denoted by reference numerals the same as those illustrated in FIGS. 7 to 12.

In the second embodiment, two waves, that is, frequency components ref_F0 and base_F1 are used as frequency components for synchronization acquisition. Then signals for synchronization acquisition of the two waves are assigned to the same frequency positions in different time slots (the sixth and seventh slots). An example of a use state of a time/frequency slot for one transmission frame will be described hereinafter in detail (FIG. 15).

A transmission apparatus transmits the frequency component ref_F0 through a path #0 and the frequency component base_F1 through a path #1.

FIG. 13 is a diagram illustrating a configuration of a reception apparatus according to the second embodiment.

As illustrated in FIG. 13, in the path #0, a configuration from an antenna 201a to an FFT unit 205a is the same as that of the reception apparatus 200 illustrated in FIG. 8.

In the reception apparatus of the second embodiment illustrated in FIG. 13, a signal output from the FFT unit 205a is supplied to two phase detectors 214a and 214b. The phase detector 214a detects a phase of the frequency component ref F0. The phase detector 214b detects a phase of the frequency component base_F1. Since the two frequency components are assigned to the different time slots as described above, the two phase detectors 214a and 214b detect the phases at different timings in terms of time.

Information on the phases detected by the phase detectors 214a and 214b is supplied to a phase difference detector 215. The phase difference detector 215 detects a difference between the phases of the two signals. Information on the difference between the phases of the two signals detected by the phase difference detector 215 is supplied to a correction phase detector 216. A configuration from the correction phase detector 216 to a delay information data determination unit 218 is the same as that illustrated in FIG. 8. However, as illustrated in a flowchart of FIG. 14, a mathematical expression used for calculation of delay information is different from that of FIG. 8.

[2-2. Operation of Reception Apparatus of Second Embodiment]

FIG. 14 is a flowchart illustrating a synchronization acquisition process performed by the reception apparatus 200.

In the flowchart of FIG. 14, the process until step S15 of performing the fast Fourier transform on a signal of the sixth time slot by the FFT unit 205a is the same as that of FIG. 9.

After the process in step S15 is performed, the process proceeds to step S31. In step S31, the phase difference detector 215 obtains the phase of the frequency component ref_F0. Thereafter, a timing when a signal of the seventh time slot is received is waited (in step S32), and the FFT unit 205a performs the fast Fourier transform on the signal of the seventh time slot (in step S33). Then the phase difference detector 215 obtains the phase of the frequency component base_F1. In accordance with information on the two phases thus obtained, the delay information data determination unit 218 determines a phase difference (in step S34).

When the phase difference is determined in step S34, Equation (4) below is used. Equation (4)

$$\text{Phase Difference} = (\text{Phase of ref}\_F0) - (\text{Phase of base}\_F1)$$

After the phase difference is obtained in accordance with Equation (4), as with the first embodiment, a phase correction value is obtained using Equations (2) and (3).

The delay information data determination unit 218 obtains a relative delay using the phase correction value thus obtained and transmits the relative delay to a communication controller 209. The communication controller 209 performs correction using the relative delay taking a time difference corresponding to timings of reception processes of the two reception paths into consideration.

Alternatively, the communication controller 209 transmits a value of the obtained relative delay from the reception apparatus 200 to a transmission apparatus 100 which performs correction.

Note that, also in the second embodiment, a data demodulation process performed after the synchronization acquisition is completed is the same as that of the first embodiment illustrated in FIG. 10.

[2-3. Example of Signal Assignment]

FIG. 15 is a diagram illustrating use of slots included in a time/frequency grid in one transmission frame.

In FIG. 15, two slots in the same frequency position in the sixth and seventh time slots included in the grid standardized for the LTE are assigned to the two frequency components ref_F0 and base_F1. The sixth time slot corresponds to a slot position to which SSSs serving as preambles are assigned. The seventh time slot corresponds to a slot position to which PSSs serving as preambles are assigned.

Using a frequency position of unused slots to which the SSSs and the PSSs are not assigned in the sixth and seventh time slots, the frequency components ref_F0 and base_F1 are transmitted. The frequency components ref_F0 and base_F1 are transmitted from the paths #0 and #1 of the transmission apparatus 100, respectively.

[2-4. Example of Correction of Relative Delay Using Phase Correction Value]

Figure 16:
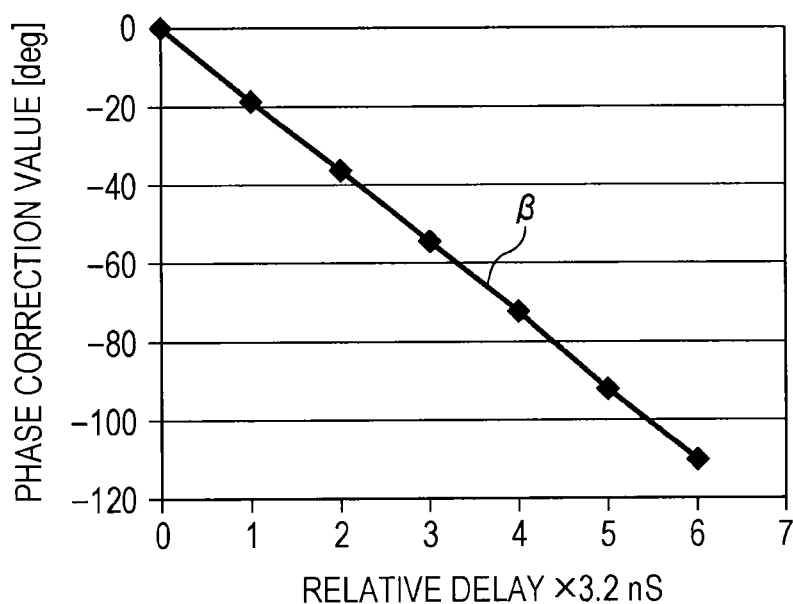
FIG. 16 is a diagram illustrating the relationship between a phase correction value and a relative delay according to the second embodiment of the present disclosure.

FIG. 16 is a diagram illustrating a result of simulation of the second embodiment. Conditions for the simulation of FIG. 16 are the same as those of FIG. 12, and meanings of an axis of ordinate and an axis of abscissa is also the same as those of FIG. 12.

A slot number 10 in a frequency direction is used for the frequency components ref_F0 and base_F1. Furthermore, an IFFT size is 200. A characteristic β in which a phase delay linearly increases as a relative delay increases is shown in FIG. 16. For example, a phase change of approximately 20 degrees is shown relative to a relative delay of 3.2 nS.

As described above, as with the first embodiment, also in the second embodiment, a relative delay within one IFFT chip among a plurality of MIMO transmission streams can be detected.

[3. Modifications]

Note that the foregoing description discloses the simplest MIMO system in which a transmission apparatus performs transmission using two transmission paths and a reception apparatus performs reception using two reception paths. However, the examples of the present disclosure may be applied to an MIMO system including a larger number of transmission paths and a larger number of reception paths.

Furthermore, the reception apparatus of the present disclosure is applicable to a reception apparatus employed in the multiuser MIMO (MU-MIMO) in which a plurality of terminals are included in a transmission side, for example.

Furthermore, the configurations and the processes described in the claims of the present disclosure are not limited to the foregoing embodiments. It is understood that it is apparent for those skilled in the art that various modifications, combinations, and other embodiments may be made in terms of design and other elements within the scope of the claims and equivalents of the claims

The invention claimed is:

1. An electronic device comprising:
 a first antenna configured to receive a first high-frequency signal;
 a second antenna configured to receive a second high-frequency signal: and
 circuitry configured to:
 generate a first digitized baseband signal from the first high-frequency signal;
 generate a second digitized baseband signal from the second high-frequency signal;
 specify a position of a preamble included in the first digitalized baseband signal;
 calculate a square signal of an autocorrelation of the preamble;
 specify a peak value obtained by the square signal of the autocorrelation of the preamble;
 perform a fast Fourier transform (FFT) on the first digitized baseband signal using a position of the peak value as a start of an FFT window;
 extract a plurality of phases of a plurality of frequency components for phase measurement from the first digitized baseband signal which has been subjected to the FFT;
 obtain a phase difference of the plurality of phases;
 determine a relative delay between the first high-frequency signal and the second high-frequency signal based on the phase difference and a phase reference; and
 demodulate the first digitized baseband signal and the second digitized baseband signal based on the relative delay.

2. The electronic device of claim 1, wherein the plurality of frequency components includes a first frequency component (f0), a second frequency component (f1) and a third frequency component (f2).

3. The electronic device of claim 2, wherein the circuitry is configured to obtain the phase difference according to the following formula:

Phase Difference =[((Phase of f1)−(Phase of f0))/(f1−f0)]×(f2−f0)−(Phase of f2).

4. The electronic device of claim 3, wherein the circuitry is configured to obtain the phase reference according to the following formula:

Phase Reference =(360×f0)/inverse fast Fourier transform (IFFT) size.

5. The electronic device of claim 4, wherein the circuitry is configured to determine the relative delay based on a phase correction value obtained according to the following formula:

Phase Correction Value =mod(Phase Difference/Phase Reference), wherein mod denotes a residue of the division between the phase difference and the phase reference.

6. The electronic device of claim 2, wherein the first frequency component (f0), the second frequency component (f1) and the third frequency component (f2) are each assigned to a same preamble time slot in the first high-frequency signal.

7. The electronic device of claim 1, wherein the plurality of frequency components includes a first frequency component (f0) and a second frequency component (f2).

8. The electronic device of claim 7, wherein the circuitry is configured to obtain the phase difference according to the following formula:

Phase Difference =(Phase of f0)−(Phase of f2).

9. The electronic device of claim 8, wherein the circuitry is configured to obtain the phase reference according to the following formula:

Phase Reference =(360×f0)/inverse fast Fourier transform (IFFT) size.

10. The electronic device of claim 9, wherein the circuitry is configured to determine the relative delay based on a phase correction value obtained according to the following formula:

Phase Correction Value =mod(Phase Difference/Phase Reference), wherein mod denotes a residue of the division between the phase difference and the phase reference.

11. The electronic device of claim 7, wherein the first frequency component (f0) and the second frequency component (f2) are each assigned to a same preamble time slot in the first high-frequency signal.

12. The electronic device of claim 7, wherein the first frequency component (f0) and the second frequency component (f2) are each assigned to consecutive time slots in the first high-frequency signal.

13. A method performed by an electronic device, the method comprising:
receiving a first high-frequency signal through a first antenna; receiving a second high-frequency signal through a second antenna;
generating a first digitized baseband signal from the first high-frequency signal;
generating a second digitized baseband signal from the second high-frequency signal;
specifying a position of a preamble included in the first digitalized baseband signal;
calculating a square signal of an autocorrelation of the preamble;
specifying a peak value obtained by the square signal of the autocorrelation of the preamble;
performing a fast Fourier transform (FFT) on the first digitized baseband signal using a position of the peak value as a start of an FFT window;
extracting, by circuitry of the electronic device, a plurality of phases of a plurality of frequency components for phase measurement from the first digitized baseband signal which has been subjected to the FFT;
obtaining, by the circuitry, a phase difference of the plurality of phases;
determining a relative delay between the first high-frequency signal and the second high-frequency signal based on the phase difference and a phase reference; and
demodulating the first digitized baseband signal and the second digitized baseband signal based on the relative delay.

14. The method of claim 13, wherein the plurality of frequency components includes a first frequency component (f0), a second frequency component (f1) and a third frequency component (f2).

15. The method according to claim 14, wherein the phase difference is obtained according to the following formula:

Phase Difference =[((Phase of f1)−(Phase of f0))/(f1−f0)]×(f2−f0)−(Phase of f2), the phase reference is obtained according to the following formula:

Phase Reference =(360×f0)/inverse fast Fourier transform (IFFT) size, and the relative delay is determined based on a phase correction value obtained according to the following formula:

Phase Correction Value =mod(Phase Difference/Phase Reference), wherein mod denotes a residue of the division between the phase difference and the phase reference.

16. The method according to claim 14, wherein the first frequency component (f0), the second frequency component (f1) and the third frequency component (f2) are each assigned to a same preamble time slot in the first high-frequency signal.

17. The method of claim 13, wherein the plurality of frequency components includes a first frequency component (f0) and a second frequency component (f2).

18. The method according to claim 17, wherein
the phase difference is obtained according to the following formula:

Phase Difference =(Phase of f0)−(Phase of f2), the phase reference is obtained according to the following formula:

Phase Reference =(360×f0)/inverse fast Fourier transform (IFFT) size, and the relative delay is determined based on a phase correction value obtained according to the following formula:

Phase Correction Value =mod(Phase Difference/Phase Reference), wherein mod denotes a residue of the division between the phase difference and the phase reference.

19. The method according to claim 17, wherein the first frequency component (f0) and the second frequency component (f2) are each assigned to a same preamble time slot in the first high-frequency signal.

* * * * *